BEST AVAILABLE COPY
ORIGINAL MUTILATED
SUB [redacted]
S. S. Gray,
Collar.
No. 1646.
Reissued. Mar. 29 1864.
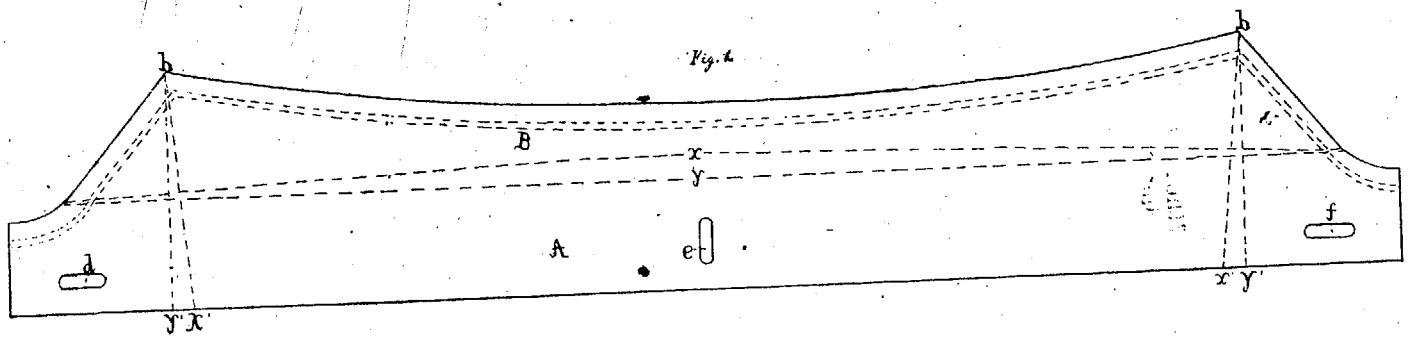
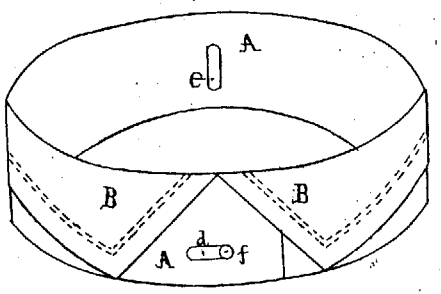
Solomon S. Gray
Inventor.
N. Ames } Witnesses

BEST AVAILABLE COPY

UNITED STATES PATENT OFFICE.

SOLOMON S. GRAY, OF BOSTON, MASSACHUSETTS.

IMPROVEMENT IN SHIRT-COLLARS.

Specification forming part of Letters Patent No. 38,961, dated June 23, 1863; Reissue No. 1,616, dated March 29, 1864.

*To all whom it may concern:*

Be it known that I, SOLOMON S. GRAY, of Boston, in the county of Suffolk and State of Massachusetts, have invented certain new and useful Improvements in Turn-Over Shirt-Collars; and I do hereby declare the following to be a full, clear, and exact description of the same, reference being had to the accompanying drawings, making a part of this specification, in which—

Figure 1 represents the outline of the collar before it is turned over, with lines dotted thereon to illustrate the mode and manner of folding it over and the effect produced thereby. Fig. 2 represents a perspective view of the same turned over and brought into a circular form as it would be on a person's neck.

The same letters indicate like parts in both of the drawings.

In the making of turn-over shirt-collars of paper, or of cloth and paper combined, it is exceedingly difficult to fold the material so that when turned over on the arc of a circle it will present a regular line. This cannot be done by the eye, but must be done by a gaged line made in the material, or by a former of suitable shape laid on the material as a guide to turn it over by.

The first part of my invention consists in turning over the collar by a line pressed into the material by a die, or by drawing a pointed instrument over it beside a pattern, and then following the indented line, or by turning it over the edge of the pattern or block of the proper curve or line.

Another defect or difficulty in turn-over collars made of paper, or of paper and cloth combined, consists in the wrinkling or puckering of the inner part when brought into a circular form, as it is when on the neck of the wearer, and which is occasioned by the inner part of necessity occupying a smaller circle than the outer part.

The second part of my invention consists in turning the collar over in a curved line or in a series of straight lines and slight angles, by which means the wrinkling or puckering is entirely obviated.

In a paper, or a cloth and paper combined, collar, if turned over on a straight line, in addition to the wrinkling and puckering there is another objection, viz., the difficulty of inserting a necktie underneath the turned-down portion and the band, and when inserted it increases the tendency of the inside to wrinkle and pucker, but by turning over the collar on a curved line, or on a series of straight lines that elongate the line by which it is turned over, there is a space formed between the turned-down portion and the band portion in which the necktie can be laid without the least tendency to wrinkle or pucker.

The third part of my invention consists in so turning over a collar made of paper, or of paper and cloth combined, on a curved or arched line as that a space shall be left between the turned-over portion and the band portion, which space may be occupied by a necktie of any ordinary description.

To enable others skilled in the art to make and use my invention, I will proceed to describe the same with reference to the drawings.

My invention is not confined to any particular style of turn-over collar, but I regard it as more particularly applicable to collars made of paper, or of paper and cloth combined.

Hitherto collars have been turned over in a straight line, as represented by the dotted line Y in Fig. 1, and the practical objection to all such collars has been mentioned above. The line X, however, as will be seen in said Fig. 1, is an arc of a circle, and on this line the part B is turned over onto the part A. The best mode of doing this is to make in the collar an impression of the curve or line on which it is to be turned over either by means of a die pressed upon it or by drawing a pointed instrument over it beside or along a pattern. When this is done, the collar can be readily turned over on or following the indented line, or the collar may be turned over the edge of a pattern or block of the proper curve or line.

The line X, instead of being in a curve or arc of a circle, might be composed of a series of straight lines with an angle at the center of the collar and accomplish the desired object about as well. I prefer, however, to make the folding line on the arc of a circle.

In turning the collar over on a curved line, as at X, instead of a straight line, as at Y, the corners *b b* of the turn-over part B will be

BEST AVAILABLE COPY over the points X′ X′ instead of the points Y′ Y′, where a straight line would bring them, by which it is evident that the longer space from Y′ to Y (*i. e.*, from *b* to *b*) has only to cover the shorter space from X′ to X′ on the part A, forming the inner circle, and thus the inner circle will not be wrinkled or puckered by the tension of the outer one. Besides, by turning the collar on a curved line so far from the outer portion crowding upon the inner portion and thus wrinkling it, the portion B will actually stand off from the portion A a distance corresponding somewhat to the space shown between the lines *b* Y′ and *b* X′, and varying only with the extent of curvature of said folding or turn-over line. This space between the two portions A B when the folding over is done is available for a necktie if one be worn, but the space itself prevents the two parts from pressing against each other, which pressing tends to wrinkle one or the other.

*d*, *e*, and *f* represent the button-holes, which are punched in the material in the usual way.

The drawings are about the size of a medium collar, and the greatest distance from the straight line Y to the curved line X is about one-fourth of an inch. It may, however, be more or less and still accomplish the object required. Collars thus constructed never wrinkle or pucker, and may be even rolled up into a circle of not more than an inch or so in diameter (as is often convenient for transportation) without the slightest injury, as the difference in length of the outer and inner portion and the fact that the outer portion stands off from the inner portion so as to leave clear space between them admits of such rolling.

Having thus fully described my invention, what I claim therein as new, and desire to secure by Letters Patent, is—

1. The turning over of a paper, or of a paper and cloth, collar by a defined line, whether pressed into the material by a die or pointed instrument or by bending it over the edge of a pattern or block of the proper curve or line, substantially as described.

2. Turning the part B of a paper, or a paper and a cloth, collar over, onto, or toward the part A in a curved or angular line instead of a straight line, substantially as and for the purpose described.

3. So turning over the part B onto or toward the part A in the manner above described as that a space shall be left between the two parts for the purpose and substantially in the manner herein described.

SOLOMON S. GRAY.

Witnesses:
A. B. STOUGHTON,
JAMES A. WOODBURY.